United States Patent Office 2,866,738
Patented Dec. 30, 1958

2,866,738

DEIONIZED CORN STEEP LIQUOR IN PRODUCTION OF TETRACYCLINE

Pasquale Paul Minieri, Brooklyn, N. Y., and Melvin C. Firman, Princeton, and Herman Sokol, Fort Lee, N. J., assignors to American Cyanamid Company, New York, N. Y., a corporation of Maine No Drawing. Application January 12, 1955
Serial No. 481,494

6 Claims. (Cl. 195—116)

The present invention relates to a new and therapeutically useful broad-spectrum antibiotic product and to its production by a fermentation and recovery process. This application is a continuation-in-part of our co-pending application Serial No. 382,637, filed September 28, 1953, now U. S. Patent No. 2,734,018.

We have discovered that under proper process conditions (as exemplified in the following), including use of an organism of the species Streptomyces aureofaciens or a mutant of such an organism, there is produced in a fermentation broth and its crude product a high concentration of an antibiotic substance different from those known before, and different in particular from the substance chlortetracycline heretofore produced from organisms of that species; that under proper process conditions (also exemplified below) this substance can be formed in the fermentation broth and its crude concentrate with no material concomitant formation of chlortetracycline, and there can be recovered a new product containing this antibiotic substance in high concentration with little or even no detectable content of other antibiotic substance; and further that this product has properties which mark it as a new and useful therapeutic product likely to prove superior to known broad-spectrum antibiotics.

We first produced this substance in good yield and relatively high concentration from a fermentation broth otherwise conventional but substantially free of chloride, using as the organism a strain of the species S. aureofaciens found in a soil sample obtained in Texas. We have since produced the substance in higher concentration using a mutant of that organism, designated UV-8, having distinctive characteristics; and we have reason to believe that further mutants of this or other organisms will permit production of this substance in high concentration in a broth containing a substantial content of chloride.

The new antibiotic substance of the present invention is tetracycline. The name tetracycline was first applied to the molecular portion common to aureomycin and terramycin (Brunings et al.; J. A. C. S., 74: 4976–4977, October 5, 1952); and later to a theoretical substance of which it was speculated that it might show antibiotic activity (Regna; Jour. N. Y. Acad. of Science, Ser. II, vol. 15, No. 1, pages 12–17, November 1952). Preparation of tetracycline by a catalytic hydrogenation of chlortetracycline has been reported recently (J. A. C. S., 75: 4621, 4622, September 20, 1953). Prior to those publications or information of their contents we had produced tetracycline which we designated substance HA-20A and had recognized its relation to but difference from either of the substances now designated as chlortetracycline and oxytetracycline. Its freedom from chlorine differentiated it at once from chlortetracycline, and its behavior in certain respects indicated a difference from oxytetracycline, which subsequent study has confirmed, despite a resemblance in other respects.

The antibiotic substance is an amphoteric substance which forms salts with acids and bases. Its solubility in water varies with the pH, becoming greater as the pH is raised or lowered from approximately 6.

The form which is least soluble in water at an intermediate pH is referred to as isoelectric, or amphoteric material or as free base. It has been found by in vitro tests that these acid and basic salts as well as the isoelectric material or free base are effective against a large number of bacteria including both Gram positive and Gram negative bacteria, such as:

Staphylococcus aureus
Sarcina lutea
Bacillus subtilis
Escherichia coli
Aerobacter aerogenes
Proteus vulgaris
Klebsiella pneumoniae
Salmonella schottmülleri
Mycobacterium tuberculosis Other bacteria are also affected in varying degrees as will be more fully shown.

The acid salts of tetracycline base may be readily prepared by dissolving the free base in water or other suitable solvent acidified with an organic or inorganic acid, for example, hydrochloric acid, sulfuric acid or acetic acid. Similarly the basic salts may be readily formed by adding an organic or inorganic base, for example, sodium hydroxide, calcium hydroxide, organic amines or quaternary ammonium salts to a solution of the free base.

Tetracycline can be distinguished from previously known antibiotics in many ways. A chemical analysis of the free base shows that the antibiotic contains the following elements: Carbon, hydrogen, nitrogen and oxygen (by difference). Since it does not contain sulfur or chlorine, it is distinguished from many others and particularly from chlortetracycline, which contains chlorine.

As is characteristic of many organic compounds, the properties of crystalline tetracycline are somewhat dependent upon the degree of purity and the manner in which the crystals are formed. When precipitated from solutions containing water, the free base precipitates as the trihydrate, which may be dried to the anhydrous form. Normally the free base is used in the trihydrate form, as the anhydrous form is quite hygroscopic and hydrates readily in the presence of moisture.

Crystals of tetracycline free base trihydrate were examined crystallographically and were found to belong to the orthorhombic system. These crystals exhibited the following optical characteristics:

Refractive indices:
  Alpha=1.572±0.005
  Beta=1.646±0.005
  Gamma=greater than 1.750
Sign of birefringence is positive
Dispersion: red greater than violet
Optic axial angle:
  2E is less than 50° (25° to 50°)
  2V is therefore 14° to 27°
Interference figure: Visible in view exhibiting gamma and beta values. Acute bisectrix is parallel to vibration direction of gamma
Optical axial plane is perpendicular to the vibration direction of beta.

The optical rotation of highly pure crystalline tetracycline free base in methanol was determined.

$$(\alpha)_D^{29°\ C.} = -234° \ (0.82\% \ \text{in methanol})$$

The precise solubility of the free base, as is the case with most antibiotics, is closely related to the degree of purity. In Table I are listed approximate solubilities of the free base trihydrate of high purity in various organic solvents.

TABLE I

| Solvent | Solubility in 100 ml. |
|---|---|
| Methanol | At least 3 g. |
| Ethyl acetate | 25 mg. |
| Chloroform | 20 mg. |
| Water | Less than 10 mg. |
| Benzene | Less than 10 mg. |
| Diethyl ether | Less than 10 mg. |

The melting point of anhydrous crystalline tetracycline free base, as for many other organic materials, depends to a certain extent on a number of factors including the degree of purity and the manner in which the crystals are heated. Crystals of highly pure anhydrous free base on a microscope slide were placed on a hot stage at 100° C. The temperature was increased at the rate of 2° per minute until a temperature of 145° was reached and then at 1° per minute until the crystals melted. When heated under these conditions, the melting point was in the range of 160°–168° C. with decomposition. If the stage is heated to 155° C. initially and the temperature of the sample is increased at the rate of 1° per minute, the substance melts over a somewhat narrower range. While these crystals were not absolutely pure, it is believed that this range is characteristic.

A sample of the trihydrate in a capillary melting point tube was placed with a thermometer in a test tube containing Dow-Corning Silicone No. 200 at 150°–155° C. This test tube was immersed in a bath of the same material at 160°–165° C., which was then heated with stirring so that the temperature rose 1–2° per minute. The sample expanded slowly when the inner tube temperature rose to 160°–165° C. There was no darkening but a yellow color developed. When the temperature reached 170°–175° C., darkening started to take place. This became more pronounced with a further increase in temperature. When a sample of the anhydrous free base was subjected to the same treatment, similar results were obtained.

The optical rotation of a solution of highly pure tetracycline hydrochloride crystals in water was determined.

$$(\alpha)_D^{29°\ C.} = 283° \ (0.65\% \text{ in water})$$

The ultra-violet absorption of both the free base and the hydrochloric acid salt of tetracyline was determined by measuring the optical densities of methanol solutions versus a methanol blank at various wave lengths (Beckman quartz spectrophotometer—Model DU). A solution of 1.0 mg. of the free base in 50 ml. of methanol gave the following maximum and minimum values:

$E_{1\ cm.}^{1\%}$ at 235 mu=188

$E_{1\ cm.}^{1\%}$ at 269 mu=271

$E_{1\ cm.}^{1\%}$ at 298.5 mu=128

$E_{1\ cm.}^{1\%}$ at 365 mu=272

The ratio of $E_{1\ cm.}^{1\%}$ at 269 to that at 365 is 1.00 and is characteristic of the purified antibiotic.

A solution of 1.10 mg. of tetracycline hydrochloride in 50.0 ml. of methanol gave the following maxima and minima:

$E_{1\ cm.}^{1\%}$ at 234 mu=179

$E_{1\ cm.}^{1\%}$ at 270 mu=301

$E_{1\ cm.}^{1\%}$ at 298.15 mu=131

$E_{1\ cm.}^{1\%}$ at 363 mu=274

The ratio of $E_{1\ cm.}^{1\%}$ at 270 to that at 363 is 1.10 and is characteristic of the antibiotic.

A suspension obtained by mulling crystals of tetracycline in a neutral mineral oil shows many characteristic absorption bands in the infrared region of the spectrum. The infrared absorption spectrum of the free base, with- in the characteristic fingerprint region of the spectrum, is shown in Figure 1 of the accompanying drawings. The location of the characteristic absorption bands are as follows, all values being rounded to the nearest five hundredths:

| | | | |
|---|---|---|---|
| 7.3 microns | 8.55 microns | 10.6 microns | 12.55 microns |
| 7.5 microns | 8.9 microns | 11.3 microns | 12.9 microns |
| 7.8 microns | 9.3 microns | 11.7 microns | 13.85 microns |
| 8.3 microns | 9.65 microns | 12.0 microns | 14.2 microns |
| | | 12.2 microns | 14.45 microns |

The infrared absorption spectrum of the hydrochloride salt in a neutral mineral oil mull is shown in Figure 2. The location of the characteristic absorption bands in the characteristic fingerprint region of the spectrum are as follows, all values being rounded to the nearest five hundredths:

| | | | |
|---|---|---|---|
| 7.0 microns | 8.25 microns | 10.1 microns | 12.95 microns |
| 7.5 microns | 8.6 microns | 10.6 microns | 13.6 microns |
| 7.7 microns | 8.9 microns | 11.7 microns | 14.5 microns |
| 7.9 microns | 9.75 microns | 12.75 microns | |

Tetracycline, the antibiotic produced by the process of the present invention, is characterized in further detail in our aforesaid application, Serial No. 382,637. The physical, chemical and physiological properties of the antibiotic have also been described in numerous scientific publications and further enlargement upon these properties appears to be unnecessary at this time.

Tetracycline is produced by fermentation using a microorganism exemplified by one newly isolated from a soil sample collected in the State of Texas and by various organisms of the same species. It also is produced by mutants, some of which have developed characteristics not typical of the species. The Texas organism belongs to the species *Streptomyces aureofaciens* described in Duggar Patent No. 2,482,055—"Aureomycin and Preparation of Same."

Table II sets forth the cultural characteristics of two isolates derived from the Texas culture which have been used in the production of tetracycline. These characteristics are identical with those exhibited by a known culture of *S. aureofaciens*.

TABLE II

| | |
|---|---|
| Glucose broth | Yellowish growth settled on the bottom, acid reaction. |
| Lactose broth | Yellowish growth settled on the bottom, no acid reaction. |
| Glycerin broth | Yellowish growth settled on the bottom, no acid reaction. |
| Sucrose broth | Yellowish growth settled on the bottom, acid reaction. |
| Litmus milk | Surface growth, slight clearing, no pH change. |
| Gelatin stab | Growth good at the surface, no liquefaction, yellow pigment. |
| Asparagine-meat extract agar | Slight yellow pigment, good growth, aerial hyphae, white becoming grey. |
| Czapek-Dox agar | Poor growth, flat colorless mycelium, no aerial hyphae, no soluble pigment. |
| Emerson agar | Heavy growth, brownish mycelium, no aerial hyphae, back brownish slight soluble brown pigment. |
| Nutrient glucose agar | Same as Emerson. |
| Glycerin asparagine agar | Growth heavy, white aerial hyphae turning grey, back greenish yellow, slight soluble yellow pigment. |
| Starch agar | Flat colorless mycelium, no aerial hyphae no soluble pigment, hydrolysis. |
| Calcium malate agar | Growth heavy, aerial hyphae white turning grey, pigment brownish. |

The strains, variations or mutants of *Streptomyces aureofaceins* which are preferred are those which produce relatively high yields of tetracycline in the fermentation broth, particularly those which will produce more than 500 mcg./ml. An example is an organism, UV-8, which is a mutant of the Texas microorganism. This mutant is a new strain which produces such yields in the fermentation medium and is a strain not described heretofore. Strain UV-8, when grown on Waksman agar (Journal Bacteriology: 7: 339–341, 1922) exhibits heavy mycelial growth which is off-white at first, becoming yellow and which is gradually covered with a powdery white aerial mycelium, which later sporulates. Old slants exhibit a jet-black coloration with small patches of white mycelium. This black growth consists of a mass of bodies in short chains which are easily disrupted. These bodies are variable in size and shape, ranging approximately from 0.5 up to 4.5 mu and varying in shape from oval to slightly angular globose-spherical. The average size is somewhat greater than those in S. aureofaciens (NRRL–2209) and there is greater variation in size and shape.

The present invention is not limited to UV–8 or any particular organism but includes any S. aureofaciens organism or variant or mutant, either naturally occurring or artificially induced, which produces tetracyline in concentrations making possible the recovery of the therapeutic product. In fact, the invention is not necssarily restricted to any species of Streptomyces. Control of the chloride content of the fermentation medium is one of the critical parts of the invention and the process is broadly applicable to any fermentation process utilizing a tetracycline producing microorganism which also tends to produce chlortetracycline in the presence of chloride ions. Many different strains of streptomyces which have the ability to produce both chortetracycline and tetracycline have been observed and while it is believed that all of these are properly classifiable as *Streptomyces aureofaciens* despite some rather marked differences in their growth habits and nutritional requirements, note Duggar et al.: Annals of the New York Academy of Sciences, volume 60, pp. 71–101, published October 29, 1954, yet there are those who might be inclined, for one reason or another, to assert that their tetracycline-producing microorganism belongs to a different species. In view of this possible conflict of terminology and in view of the generic nature of the present invention, applicants wish to include within the scope of the claims herein the use of all microorganisms having the tetracycline-producing qualities set forth above.

As stated in our earlier co-pending application, the fermentation medium for use in the process of the invention, contains sources of assimilable carbon and nitrogen, inorganic salts, minor elements and various other agents which will be mentioned in greater detail hereinafter. It is also pointed out in our co-pending application that most strains of S. aureofaciens which produce tetracycline also tend to produce chlortetracycline if chloride ions are available. Theoretically, one part of available chloride ion can result in about 14 parts of chlortetracycline. Since many S. aureofaceins are efficient utilizers of chloride ions, it is desirable that the chloride ion be kept at a minimum. Ideally, the chloride ion should be even less than one part per million. However, it is not economically feasible to produce fermentation media having this low concentration of chloride ion and therefore our invention contemplates the use of higher concentrations of chloride ion in the fermentation medium.

The preparation of fermentation media containing less than 10 parts per million of chloride ion is comparatively easy when the medium is a so-called "synthetic medium," that is, one in which the carbon requirements of the fermentation are supplied by relatively pure materials such as sucrose and the nitrogen is supplied by ammonium sulfate or other highly purified chemical substances. Unfortunately these synthetic media are very expensive and lack some of the essential metabolites of the fermentation process wherein high yields of tetracycline may be obtained. For this and other reasons not fully understood, it is desirable to use naturally-occurring materials in preparing fermentation media such as, for example, corn steep liquor, animal stick liquor, casein digests, and the like. Not only are these materials cheaper than are the materials of the synthetic media, but they result in much higher yields of the desired antibiotic. Unfortunately these materials carry substantial quantities of chloride ions and in producing tetracycline by fermentation, undesirably large amounts of chlortetracycline are concomitantly produced.

Tetracycline is considered to be a superior antibiotic and physicians generally wish to treat their patients with drugs of known composition. It is preferred, therefore, that the antibiotic be substantially pure. Limits on the purity of tetracycline offered for sale as such, have been established so that commercial tetracycline should contain at least 96% tetracycline. Accordingly, it is highly desirable that the process of producing tetracycline yield a product which is essentially free of other antibiotics. During the processing and purification operations, some of the chlortetracycline that may be contained in the fermentation broth is eliminated by the isolation procedure and by chemical decomposition, particularly under alkaline conditions, and a crude fermentation liquor may serve as a starting material in which there may be as much as about 8–10% chlortetracycline, without incurring unnecessary expense in separating the undesirable chlortetracycline component.

As noted in our co-pending application, Serial No. 382,637, natural materials often used fermentation media contain chloride ions, but these materials may be used, nevertheless, if they are first deionized with ion exchangers or other suitable means of removing chloride ions. Various ion exchange materials may be used for these purposes and their nature and manner of use will be described in more detail hereinafter.

As shown in our co-pending application, natural materials such as corn steep liquor may be diluted with water to a concentration suitable for passing through an ion exchange bed and the chloride ion removed to the extent considered necessary. Additional nitrogen, carbon and mineral element requirements of the fermentation medium may then be added to the de-ionized corn steep solution and the fermentation medium is then ready for use in the process. Corn steep liquor contains substantial quantities of chloride ions, of the order of 0.15% to 0.5% by weight, and greater care must be exercised in treating material of this type than in the case of other natural substances used in the preparation of fermentation medium.

Casein, which is a very useful material for preparing fermentation liquors, is apt to contain large quantities of chloride ion depending upon the method in which it was prepared. Amounts of chloride ion up to 0.30% are frequently encountered. Enzymatic digests of casein which are also useful in preparing fermentation media may contain even higher concentrations of chloride ion and these products should be treated in accordance with the teachings of the present invention, if used in the preparation of fermentation liquors for the production of tetracycline.

Animal stick liquor, meat meal and fish meal digests and various other materials, particularly of animal origin, contain large quantities of chloride ion and solutions prepared from these substances should be treated in accordance with the teachings of the present invention to reduce their chloride ion content.

It will be understood, of course, that components of the fermentation medium which are in insoluble form cannot be passed through ion exchange beds without soon stopping them with insoluble deposits. The process of the present invention contemplates treatment of soluble components of the medium such as those mentioned herein. Highly viscous substances are also difficult to pass through ion exchange beds and must, therefore, be diluted with water to a consistency which will permit ample flow through the bed.

In some instances where insoluble materials are to be added to the fermentation medium, these may be washed with deionized water to remove chloride ions prior to adding them to the fermentation medium. Obviously, the nature of the material will determine the treatment. Raw starch, for example, which often contains considerable quantities of chloride ion may be washed with deionized water added to the fermentation medium and then cooked or otherwise treated to make it available for assimilation by the fermenting microorganism. Soluble forms of starch may when properly diluted be passed through the ion exchange bed to remove chloride ions.

Soy bean meal preparations often contain excessive amounts of chloride ions for the production of tetracycline and when materials of this type are used in significant amounts, it should also be treated by ion exchange techniques as described above. The same observations apply to other naturally occurring materials which are used to prepare fermentation liquors when their chloride ion content is too high.

In our co-pending application, Serial No. 382,637, we state that we prefer to use tetracycline producing strains of *Streptomyces aureofaciens* which will produce more than 500 micrograms per milliliter of the antibiotic. In such cases the fermentation medium may contain 10 parts per million of chloride ion although lower amounts are preferred. Further, improvements in selecting strains of tetracycline producing streptomyces have resulted in marked increases in the yield of tetracycline that can be formed so that it is now easily possible to produce 5000 micrograms per milliliter, and even more, of tetracycline. This result is achieved not only by the selection of particularly high-producing tetracycline strains, but also by careful selection of the materials making up the fermentation medium and restriction of the chloride ion content. Our invention, therefore, contemplates the use of strains of *S. aureofaciens* capable of producing amounts of tetracycline in excess of 500 micrograms per milliliter in fermentation media containing natural materials of the type now commonly used in other fermentation processes which have, however, been treated to eliminate as much of the chloride ion content as possible. In this manner, it is possible to produce crude fermentation broths having only a small proportion of the total antibiotic present as chlortetracycline.

As noted above, it is permissible, although not desirable, to have as much as 8 to 10% of the total antibiotic as chlortetracycline in the crude fermentation broth. As will be seen, therefore, a fermentation broth containing 5000 micrograms per milliliter of tetracycline might have as much as 500 micrograms per milliliter of chlortetracycline, which could result from the presence of 40 to 50 parts per million of chloride ion in the fermentation media when the microorganism is an efficient utilizer. If the particular strain employed in the process does not fully utilize the chloride ions, the fermentation liquor may contain larger amounts of chloride ion. In such instances many natural materials need not be treated in accordance with the process of the invention as their chloride ion content is already sufficiently low. However, the most effective substrates for the formation of high yields of antibiotic include corn steep liquor, which, as previously noted, is very high in chloride content and fermentation liquors containing significant amounts of this material can be improved if treated.

In common with other fermentation processes for the production of antibiotics, the fermentation liquors will contain sources of assimilable carbon, nitrogen and mineral salts. Many of these are relatively free of chloride ions and are used to supplement the materials referred to above which are treated with ion exchange materials in accordance with the present invention. These include such things as sucrose, glucose, dextrin, sugar alcohols, citric acid, starch, cotton seed meal, corn meal, soy bean meal, peanut meal and various other carbonaceous and nitrogenous substances which are used in varying amounts in from about ½ to 5% by weight or more of the total weight of the fermentation medium. For purposes of higher yields and economy, mixtures of these materials are often used together with the naturally occurring products referred to above, which have been treated with ion exchange materials to remove excess quantities of chloride ions.

Mineral salts are also commercially added to fermentation media in varying amounts to support the growth of the microorganism and to promote high yields of tetracycline. Among these may be mentioned ammonium phosphate, potassium phosphate, magnesium sulfate, calcium carbonate and various trace elements including cobalt, copper, zinc, manganese, iron, chromium and still others. The use of these trace elements in promoting the fermentation is well understood by those in the art and further description appears to be unnecessary.

As will be apparent, treatment of aqueous solutions containing nutrient materials for the fermentation process for the removal of chloride ions may, by virtue of the non-selective anion-absorbing capacity of some anion exchange materials, tend to remove some of the desirable anions contained in the fermentation liquor. For example, phosphate ions may be removed from the solution under some conditions. Similarly, the sulfate anion may also be removed. To avoid this possibility and to reduce the load on the ion exchange column, it is preferred that most of the mineral elements such as the phosphates and sulfates, as well as the trace elements, be added subsequent to chloride removal by ion exchange treatment.

The principal object of the ion exchange treatment is, of course, to remove excess chloride ions from the naturally occurring materials which contain excessive amounts. Under some conditions it may also be desirable to remove certain cationic groups prior to the fermentation. Accordingly, mixed beds which remove both cations and anions may be used if desired. The use and control of such mixed ion exchange beds is a matter within the skill of the art and need not be elaborated upon further.

The ion exchange materials contemplated by the present invention include those water insoluble substances which have the property of adsorbing or otherwise removing chloride ions from aqueous solutions. They are generally synthetic resins having free amino groups, for instance, phenol-formaldehyde-polyamine condensates, melamine-guanidine-formaldehyde resins and polyalkylene-polyamine resins. The exact chemical nature of these substances and the manner in which they adsorb the chloride ions is not fully understood. They may, however, be purchased from various manufacturers by specifying that they are intended for the removal of chloride ions from aqueous solutions. Various types are available on the open market.

Although substances could be used in the present invention which would simply adsorb chloride ions, these would not be commercially feasible because they could not be reused. The term "exchange" is used in connection with the ion exchange materials of the present invention to mean a material which after adsorbing chloride ions from solution can be reactivated by removing chloride ions thus adsorbed and the resin used over again in preparing further batches of fermentation liquor.

Some ion exchange beds can be operated so that only anions are removed from solution. In others there may be a replacement. For example, in an ion exchange resin operating on the sulfate cycle chloride ions are removed and sulfate ions are given off to replace them in solution. Although it is not usually necessary, these sulfate ions can be adsorbed by a second ion exchange bed operated in tandem with the first. The same may be true with respect to other anions which may be involved. For these reasons it is important that the anionic requirements of the nutrient media, especially phosphate, be adjusted following ion exchange treatment.

Following treatment of some of the constituents of the fermentation media with ion exchange resins, the other necessary materials that are used in the fermentation process may then be added to the treated liquid, the whole sterilized, and inoculated with tetracycline producing microorganisms. The fermentation is then conducted in the usual manner.

During fermentation, it is desirable to grow the organism under submerged conditions with suitable aeration and agitation, as, for example, in a flask on a shaking machine or in a stirred fermentor equipped with a sparger for inducing a stream of air continuously. The temperature does not appear to be critical within the range of 25°–35° C., although the range of 30°–33° C. is preferable. The initial pH of the medium should be close to neutrality, although some of the antibiotic is produced in media with initial pH values as low as 5.0 or as high as 8.5.

Buffering agents such as calcium carbonate and salts of organic acids such as the citrates, acetates and lactates are useful in maintaining the pH within the proper range. In addition, the organic acids may serve as sources of carbon in the metabolism of the microorganism. The use of a defoaming agent is desirable in large scale fermentors, even though in this fermentation, foaming is not a particularly difficult problem and is readily controlled by the use of conventional defoaming agents such as octadecanol in lard oil or other suitable commercial defoamer.

Inoculum for fermentation may be prepared from growth obtained on slants inoculated with the S. aureofaciens. A suitable medium for the slants is Waksman agar having the following composition:

| | G./l. |
|---|---|
| Glucose | 10 |
| Peptone | 5 |
| $KH_2PO_4$ | 1 |
| $MgSO_4.7H_2O$ | 0.5 |
| Agar | 20 |

The slant growth may be transferred to shaker flasks which may be used as small scale laboratory fermentors or for the production of inoculum for inoculating larger fermentations.

For large scale tank fermentation, the slant growth is used to seed a suitable liquid medium in shaker flask which is shaken on a reciprocating shaking machine at temperatures ranging from 26° C.–35° C. A second shaker-flask stage is usually employed in conjunction with submerged tank fermentations in order to increase the volume of the shaken inoculum equal to 1.5% to 2.5% of the liquid volume in the tank. The reaction of the shaker flask medium is within the range of pH 6.5 to 7.5 initially and, as growth occurs, a continuous drop in the pH value is observed with values as low as 3.8 being recorded. However, a physiological age as indicated by a pH value of about 5.0 is apparently the most favorable period for transferring the inoculum.

The shaker inoculum, equal to 1.5% to 2.5% of the liquid volume in the tank, is aseptically transferred to the fermentor and grown for about 2 to 3 days with continuous agitation and aeration. Air rates equal to 0.5 to 1.5 volumes of free air per volume of liquid medium may be used depending upon the size of the fermentor. Foaming of the broth can be controlled by the sterile addition of an antifoam agent such as lard oil containing 2% octadecanol.

In the recovery of tetracycline from the ferementation broth, it is possible to employ conventional practices developed in connection with other antibiotics, such as the known solvent extractions, with or without carriers, or adsorptions. Of known solvents, such as butanol, ethyl acetate and chloroform, the use of which involves subsequent purification steps, butanol is best for the extraction of tetracycline. These known procedures are applicable with fair success in the case of fermentation broths in which little antibiotic substance other than tetracycline is formed, where the objective is simply to effect a separation between the total antibiotic content and the inactive materials ordinarily classed as impurities. In the case where there is a substantial formation of antibiotic substance other than tetracycline, as when the chloride ion level is not kept to a minimum and there is substantial formation of chlortetracycline, these known methods are less effective if it is desired to recover the tetracycline in high concentration in the end-product, omitting other antibiotic substances. (We refer here to antibiotics as substances antagonistic to E. coli.)

We have devised a novel recovery method which is highly effective in either case mentioned above, and highly effective both from the standpoint of recovering a product free of inactive impurities and from the standpoint of recovering a product free of other antibiotic substances concomitantly formed in the broth. This improved method yields a crystalline product of high purity from both standpoints. This method is exemplified below. In its main features, it involves using a particular group of quaternary ammonium salts selectively precipitating tetracycline from the broth, at an alkaline pH (pH 8 to 11) as the quaternary ammonium salt of tetracycline. This salt, after filtration, is then slurried with a small amount of water and a relatively large amount of chloroform, whereby the quaternary ammonium salt of tetracycline is dissolved in the chloroform phase of the slurry. The water and chloroform phases are then preferably separated to remove any impurities dissolved in water. The tetracycline is then extracted with an aqueous acid solution at a pH of about 1 to 2.5, with formation of the acid salt of tetracycline which goes into solution in the water phase, from which it precipitates as a crystalline product upon increase of the pH to the range from 3 to 7, precipitation starting at the lower value.

The quaternary ammonium salts that are particularly useful in this recovery method are alkyl trimethylammonium chlorides and dialkyl dimethylammonium chlorides wherein the alkyl group contains from 8 to 18 (inclusive) carbon atoms.

*Example I*

A corn steep liquor medium was prepared in the following manner. Corn steep liquor of approximately 50% solids content (w./w.) was diluted with distilled water to give a final concentration of 2%. The resulting diluted material was passed through a column packed with 30 liters of a mixture consisting of 2 volumes of Amberlite IR 45, as anionic exchange resin, and 1 volume of Amberlite IRC 50, a cationic exchange resin. Collection of the effluent did not start until the resistivity had risen to 5,000 ohm-centimeters and continued until the resistivity had dropped below 3,000 ohm-centimeters. To 1,000 ml. of the deionized corn steep liquor solution there was added the following components for the preparation of a medium suitable for the propagation of inoculum and for the production of tetracycline to produce a medium containing about 17 p. p. m. of chloride, although a lower chloride content is preferred:

| | | |
|---|---|---|
| Sucrose | grams | 30.0 |
| $K_2HPO_4$ | do | 15.0 |
| $(NH_4)_2HPO$ | do | 5.0 |
| $MgSO_4.7H_2O$ | do | 2.0 |
| $CaCO_3$ | do | 1.0 |
| KBr | do | 0.5 |
| $ZnSO_4.7H_2O$ | do | 0.05 |
| $CuSO_4.5H_2O$ | milligrams | 3.0 |
| $MnSO_4.4H_2O$ | do | 2.5 |

For the preparation of an inoculum, 50-milliliter volumes of the above medium were distributed into 250- milliliter Erlenmeyer flasks and 400-milliliter volumes into 2-liter flasks. A dry loopful of spores from the surface growth of the tetracycline organism grown on slanted semi-solid medium was used to seed the 50-milliliter volumes which were shaken at 30° C. for 72 hours on a reciprocating shaking machine (82 strokes per minute with a 2⅞ inch displacement). At the end of this time 1.0 ml. of the resulting mycelial suspension was used to inoculate 400 ml. of medium which was shaken for an additional 28 hours. Four 400-ml. volumes were pooled aseptically and used to seed the fermentor.

The fermentation medium was prepared in 25-gallon fermentors as follows: The components, at the concentrations described above were dissolved in 11.5 gallons of the deionized corn steep liquor solution for a final total volume of 15.8 gallons. The medium was sterilized at 121° C. by injecting steam at 15 p. s. i. gauge directly into the batch for 30 minutes. The volume gained from the steam condensate provided the required difference between the initial 11.5 gallons of deionized corn steep liquor-sugar-salts solution and of the final 15.8 gallons required. Upon cooling to 30° C., the mixture was seeded with the four pooled 400-ml. volumes of inoculum previously described, agitated and aerated at a rate of 1.6 volumes of air per volume of medium for 38 hours. At this time the reaction of the broth which was initially at pH 5.9 had dropped to 4.1. The broth assayed 20 mcg./ml. of antibiotic, using oxytetracycline as a standard and contained a substantial amount of tetracycline.

Corn steep liquor solutions at 1.5 and 2.0% concentrations were dionized with resin mixtures containing 3 volumes of anionic Amberlite resin IR 45 and 1 volume of cationic Amberlite resin IRC 50 (ca. 10 runs). One run was made with Rohm and Haas mixed resin MB–1 (2 volumes anionic resin IRA 400 plus 1 volume cationic resin IR 120). The ratio of resin volume to effluent volume of 1:3 was found satisfactory. A flow rate of 0.01 ml. solution/ml. resin/minute gave better deionization than 0.016 ml. solution/ml. resin/minute. The use of two resin columns in series effected good deionization. Chloride ion assay of the solutions deionized in this way showed the presence of from 3.5 to 29 p. p. m.

*Example II*

Corn steep liquor of approximately 50% solids content (w./w.) was diluted with distilled water to give a final concentration of 1.5%. This diluted material was passed through a column packed with a mixture consisting of three volumes of Amberlite IR 45, an anionic exchange resin, and one volume of Amberlite IRC 50, a cationic exchange resin. Collection of the effluent did not start until the resistivity had risen to 5000 ohm-centimeters and continued until the resistivity had dropped below 3000 ohm-centimeters. The following materials were added to the deionized corn steep liquor solution for the preparation of a medium suitable for the propagation of inoculum and the production of tetracycline:

| | | |
|---|---|---|
| Sucrose | percent | 2.0 |
| $KH_2PO_4$ | do | 1.5 |
| $(NH_4)_2HPO_4$ | do | 0.5 |
| $MgSO_4.7H_2O$ | do | 0.2 |
| $CaCO_3$ | do | 0.1 |
| $ZnSO_4.7H_2O$ | p. p. m | 50.0 |
| $CuSO_4.5H_2O$ | p. p. m | 3.0 |
| $MnSO_4.4H_2O$ | p. p. m | 2.5 |
| KBr | percent | .05 |

For use in preparation of both inoculum and fermentation flasks, this medium was distributed in 100 ml. aliquots into 500 ml. Erlenmeyer flasks and sterilized by autoclaving for 20 minutes at 121° C., 15 p. s. i. The chloride content of the medium after sterilization was 17.7 p. p. m.

Inoculum was prepared by seeding flasks with a lyophilized mixture of spores and mycelium of *Streptomyces aureofaciens* (strain 201–15) and incubating the flasks at 26° C. for 48 hours on a reciprocating shaking machine. Five percent volumes of the 48 hour inoculum was used to seed the fermentation flasks which were then incubated under the same conditions for 48 hours. Antibiotic activity was demonstrated by saturating a 13 mm. paper disc with filtered broth, placing the disc on an agar plate seeded with *Escherichia coli* and incubating at 30° C. for 18 hours.

Four hundred milliliters of this mash were treated with 2.4 g. of oxalic acid and 1.6 g. of ammonium oxalate. After stirring 10 minutes the mixture was filtered. The filtrate was then stirred with 80 ml. of ethyl acetate and the pH adjusted to 8.5. The solvent phase, which contained the bulk of the activity, was shaken with 5 ml. of water and the pH adjusted to 2. When diluted 1/600 with lower phase of system butanol-water containing 2.5% acetic acid absorption maxima in the ultraviolet at 270 $m\mu$ and 360 $m\mu$ were obtained.

Countercurrent distribution analysis (48 transfers, butanol-2.5% acetic acid) of this concentrate showed it to contain tetracycline. This was accomplished at the end of the distribution by dilution of each of the lower phases with methanol and measuring the optical density at 370 $m\mu$. The bulk of the activity was found at tube 19. The peak tube numbers for chlortetracycline and oxytetracycline are 26 and 16, respectively.

*Example III*

A shaker flask fermentation was conducted identical in all respects to that described above, except that the anionic and cationic resins employed were Amberlite IRA 400 (2 volumes) and Amberlite IR 120 (1 volume), respectively. The medium contained 13.3 p. p. m. chloride after sterilization. Antibiotic activity was demonstrated in the mash by the paper disc-*E. coli* plate method.

When this mash was treated to concentrate the antibiotic activity as described in Example II, above, ultraviolet absorption and countercurrent distribution data were shown to be substantially the same as those for the medium prepared with Amberlite resins IRC 50 and IR 45.

*Example IV*

For the preparation of inoculum to be used in 25 gallon fermentors, 50 ml. volumes of the medium described in Example II were distributed into 250 ml. Erlenmeyer flasks, and 400 ml. volumes into 2-liter flasks. A dry loopful of spores from the surface growth of *S. aureofaciens* (strain T–5) on slanted semi-solid medium was used to seed the 50 ml. volumes, which were shaken at 30° C. for 72 hours on a reciprocating shaking machine. At the end of this time, 1.0 ml. of the resulting mycelial suspension was used to inoculate 400 ml. of medium, which was shaken for 28 hours. Four 400–ml. volumes were pooled aseptically and used to seed the fermentor.

In preparing the fermentation medium, the corn steep liquor solution was made up in 2% concentration and deionized with the 3:1 mixture of Amberlite resins IRC 50 and IR 45. The other components of the medium described in Example II, were dissolved in this deionized solution in such quantities that, after 30 minutes' sterilization at 121° C. by injecting steam at 15 p. s. i. directly into the batch, the volume gained from the steam condensate provided a total volume of 15.8 gallons of medium per 25 gallon fermentor.

After cooling to 30° C., the fermentors, were seeded with 1600 ml. volumes of inoculum, mechanically agitated at 155–165 R. P. M., and aerated at a rate of 1.6 volumes of air per volume of medium for 38 hours. The broths from two such fermentations contained 81 and 116 γ/ml. of antibiotic, respectively, when assayed with *S. lutea* using oxytetracycline as a standard.

Ninety-six liters of mash, obtained by pooling the above-described batches, were treated with 920 g. of oxalic acid and the pH adjusted to 3.5. Hyflo was added, the mixture filtered and the filter cake washed with 4 liters of water. The combined filtrate and wash was extracted at pH 8.5 with 20 liters of ethyl acetate containing 1 liter of Emulsept (N-[lauroyl colamino formyl-methyl] pyridine). The solvent extract was then stirred at pH 2 with four successive 140 ml. portions of water. These aqueous concentrates were pooled and adjusted to pH 7.8. The solids which separated were filtered, washed with water and then dried in a vacuum desiccator. There were obtained 4.19 g. assaying 904 γ/mg. This represents an activity yield of 41%. The ultraviolet absorption of this material in 0.1 N sulfuric acid was determined. Maxima were found at 265 mu and 360 mu with minima at 232 mu and 301 mu. Five milligrams were distributed between chloroform and pH 7 phosphate buffer. Substantially all the activity was found in the lower phase. Under these conditions, oxytetracycline concentrates in the upper phase.

Fifty milligrams of the product was dissolved in the least amount of N hydrochloric acid and the solution seeded with a few crystals of chlortetracycline and the mixture was allowed to stand at room temperature. Crystallization began within 15 minutes. The mixture was placed in the icebox overnight. The next day the crystalline solids were separated and dried on a porous porcelain plate. An ultraviolet adsorption spectrum of the crystals in 0.1 N sulfuric acid solution showed that maxima were present at 267 mu and 360 mu and minima at 234 mu and 301 mu. A solution of the crystals in concentrated sulfuric acid containing boric acid gave a red violet coloration. Oxytetracycline and chlortetracycline under analogous conditions gave cherry red and purple colorations, respectively.

Example V 17.8 kg. of Amberlite IR-4B, a weakly anionic exchange resin of the phenol-formaldehyde-polyamine type sold by Rohm and Haas, was neutralized with 1 N sulfuric acid, packed into a six inch column to a height of 76 inches, and washed with water to an effluent pH of 2.0. 15.0 kg. of corn steep liquor were diluted with 45 liters of water and filtered at 50° C. The cake was washed with 15 liters of water. The corn steep solution was passed through the column at the rate of 40 liters per hour. A positive chloride test was obtained in the eluate after the equivalent of 13.5 kg. of steep had been treated. The chloride-free treated steep was adjusted to a pH of 4.0 with concentrated ammonium hydroxide and was then ready for use.

A fermentation medium was made up with the following components:

| | |
|---|---|
| Resin treated corn steep liquor | 20 gm./l. (solids) |
| Corn starch, sulfuric acid degraded "fluidity" | 55 gm./l. |
| Calcium carbonate | 8.0 gm./l. |
| Cottonseed flour | 3.5 gm./l. |
| Ammonium sulfate, spec. low chloride | 6.0 gm./l. |
| Phosphoric acid (85%) | 0.24 gm./l. |
| Lard oil | 1.0% (vol.) |
| Trace elements: | |
| $FeSO_4 \cdot 2H_2O$ | 41 mg./l |
| $ZnSO_4 \cdot 7H_2O$ | 100 mg./l. |
| $MnSO_4 \cdot 4H_2O$ | 50 mg./l. |
| Tap water to 100 ml. | |

The medium was sterilized 15 minutes at 125° C. and then diluted with 3 vols. of tap water. This medium contained approximately 24 parts per million of chloride ion. It was then inoculated with 2% of its volume with S. aureofaciens strain S-77 containing 1% by weight in an inoculum solids basis corn steep liquor, 3% dextrin, 0.625% calcium carbonate, and 0.2% ammonium sulfate. The fermentation was conducted at 26° C.–27° C. for 112 hours with mechanical agitation and aeration at the rate of about 0.5 volume of air per volume of medium per minute.

On harvesting, the fermented broth was found to contain over 5000 micrograms per milliliter of tetracycline with less than 5% of that amount of chlortetracycline.

To regenerate the column, 1 N sulfuric acid was passed through the column at the rate of 100 l./hr. until the effluent contained no chloride ion (200 liters of acid required). Water was passed through at the rate of 100 l./hr. until the pH rose above 2.0. 450 liters of water were required. The column is now ready for re-use. This column has been re-used fifteen times without diminution of its chloride-removing capacity or diminution in the nutritional character of the resulting corn steep liquor.

Example VI

A column similar to that of Example V was prepared using IRA-400, a strongly anionic adsorbing ion exchange resin of the phenol-formaldehyde-polyamine type produced by Rohm and Haas. Corn steep liquor was passed through the column as in Example V and a fermentation medium prepared, sterilized and inoculated with the same tetracycline producing strain of S. aureofaciens as before, and the fermentation conducted in a similar manner. This particular fermentation medium contained approximately 18 parts per million of chloride ions.

On harvesting the broth, it was found to contain 3510 gammas per milliliter of tetracycline and 255 gammas per milliliter of chlortetracycline.

Example VII

A mixed cation-anion exchange resin bed was prepared with equal parts of IRA-400 and IR-120, the latter a strong cation exchanging resin of the sulfonic acid type sold by Rohm and Haas, and treated with 1 normal ammonium sulfate similarly to the manner shown in preparing the column in Example V.

Corn steep liquor was treated as described above to remove chloride ions with this column and a fermentation medium prepared in the same manner as shown in Example V. The diluted and sterilized medium was then inoculated with S. aureofaciens strain S-77 and the fermentation conducted under the conditions described in Example V. The fermentation medium at the beginning of the fermentation contained approximately 28 parts per million of chloride ion. The fermented broth was found to contain 4670 gammas per milliliter of tetracycline and 390 gammas per milliliter of chlortetracycline.

Example VIII

Corn steep liquor was diluted with water and treated with silver nitrate to remove chloride ions as silver chloride. The chloride free steep liquor was incorporated into a fermentation similar to that of Example VII and inoculated with S. aureofaciens, and the fermentation conducted as before. On analysis, the fermented broth was found to contain 3600 gammas per milliliter of tetracycline and 270 gammas per milliliter of chlortetracycline.

Example IX

In shaker flask experiments, using the fermentation media of Example V in which the medium was enriched with 200 milligrams per liter of phosphoric acid, there was obtained 2830 gammas per milliliter of tetracycline and 210 gammas per milliliter of chlortetracycline.

When the fermentation is conducted as in the preceding paragraph, using untreated corn steep liquor at the rate of 1% total solids, the fermented broth is found to contain approximately 1600 gammas per milliliter of tetracycline and 1600 gammas per milliliter of chlortetracycline, thus showing the utilization of the available chloride ion in the corn steep liquor to produce higher proportions of chlortetracycline.

Example X

The anionic exchange resin may be operated in various forms such as the sulfate, nitrate, hydroxyl and the like. When the process described in Example V was repeated with the ion exchange resin on the nitrate cycle, being prepared by treatment with 1 normal nitric acid instead of sulfuric acid, two different runs gave 3590 gammas of tetracycline per milliliter and 210 gammas of chlortetracycline per milliliter in one run, and 4460 gammas of tetracycline per milliliter and 230 gammas of chlortetracycline per milliliter in the second run.

In the foregoing runs the fermentation liquor contained from 15 to about 30 parts per million of chloride ion and was fully utilized by the *S. aureofaciens* microorganism to produce all of the chlortetracycline that was possible in view of the chloride content of the medium. Because of the high yields of antibiotic that were obtained, However, it is noted that the proportion of chlortetracycline in these runs, wherein ion exchange resins have been used to treat corn steep liquor, is less than 8% in all cases.

We claim:

1. In a process of producing tetracycline by aerobic fermentation with a tetracycline-producing microorganism of the Streptomyces genus which is also capable of producing chlortetracycline in the presence of chloride ions, the improvement which comprises contacting an aqueous solution of the water soluble components of the fermentation medium with an ion exchange material to remove chloride ions therefrom.

2. The method of producing tetracycline which comprises the steps of preparing an aqueous nutrient medium, contacting said aqueous medium with an anionic ion exchange material to remove chloride ions from said solution and thereafter inoculating said aqueous nutrient medium with a tetracycline-producing strain of *Streptomyces aureofaciens* and allowing aerobic fermentation to take place until tetracycline is produced.

3. In a process of producing tetracycline by aerobic fermentation of an aqueous nutrient medium with a chloride-utilizing tetracycline-producing strain of *Streptomyces aureofaciens*, the step which comprises subjecting an aqueous solution of corn steep liquor to the action of an anionic exchange resin to reduce the chloride content thereof, adding said treated corn steep liquor to the fermentation medium, and allowing the *S. aureofaciens* to ferment said medium and produce tetracycline.

4. A process in accordance with claim 3 in which the total chloride content of the medium is between the range of 10 to 50 parts per million.

5. A method of producing tetracycline which comprises the steps of preparing an aqueous nutrient medium, contacting said aqueous medium with an anionic exchange resin to reduce the chloride content thereof to less than about 50 parts per million, and thereafter inoculating said aqueous nutrient medium with a tetracycline-producing strain of *S. aureofaciens* and allowing aerobic fermentation to take place until tetracycline is produced therein in amounts of at least 500 parts per million and is the major antibiotic substance therein.

6. A process in accordance with claim 5 which includes the step of adding to said deionized aqueous nutrient medium a quantity of phosphate ions.

References Cited in the file of this patent

UNITED STATES PATENTS

| | | |
|---|---|---|
| 1,197,640 | Kreigsheim | Sept. 2, 1916 |
| 2,394,031 | Waksman | Feb. 5, 1946 |
| 2,424,003 | Tanner | July 15, 1947 |
| 2,482,055 | Duggar | Sept. 13, 1949 |
| 2,609,329 | Niedercorn | Sept. 2, 1952 |
| 2,699,054 | Conover | Jan. 11, 1955 |
| 2,734,018 | Minieri | Feb. 7, 1956 |

OTHER REFERENCES

Staley et al.: Bacteriological Reviews, December 1948, pp. 297–311.

Antibiotics and Chemotherapy, vol. IV, pp. 375–379, 450–452.

Martin et al.: 2nd Am. Symposium on Antibiotics, October 1954, U. S. D. H. E. W., Paper No. 156, Abstract in Div. 63.

Nachod: Ion Exchange, 1949, Academic Press, N. Y., pp. 132, 145, 135, 136, 374, 375.